No. 618,257. Patented Jan. 24, 1899.
J. D. THOMPSON.
SKYLIGHT OPERATOR.
(Application filed July 12, 1898.)
(No Model.)
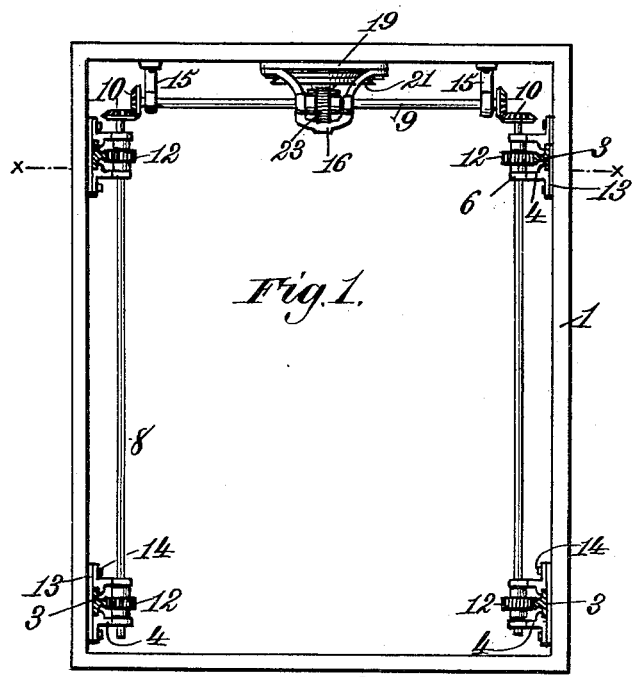
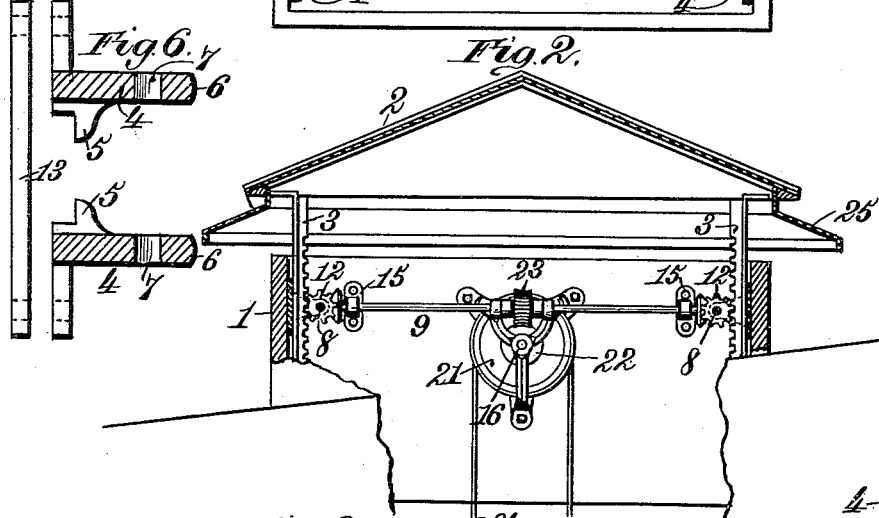
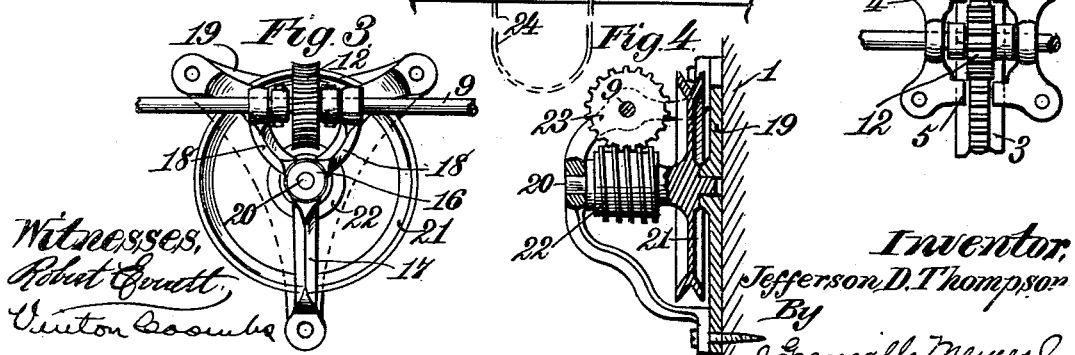
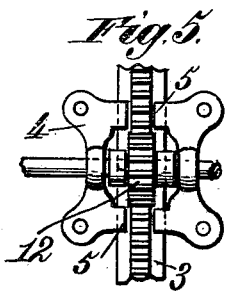
Witnesses,
Robert Everett
Vinton Coombs
Inventor,
Jefferson D. Thompson
By J. Granville Meyers
Atty.

UNITED STATES PATENT OFFICE.

JEFFERSON D. THOMPSON, OF WASHINGTON, DISTRICT OF COLUMBIA.

SKYLIGHT-OPERATOR.

SPECIFICATION forming part of Letters Patent No. 618,257, dated January 24, 1899.

Application filed July 12, 1898. Serial No. 685,753. (No model.)

*To all whom it may concern:*

Be it known that I, JEFFERSON D. THOMPSON, a citizen of the United States, residing at Washington, in the District of Columbia, have invented certain new and useful Improvements in Skylights and Means for Operating the Same; and I do hereby declare the following to be a full, clear, and exact description of the invention, such as will enable others skilled in the art to which it appertains to make and use the same.

My present invention relates to improvements in "skylights" for dwellings or other buildings, and has for its object to provide a skylight that can be raised bodily above the light shaft or well, so as to admit of a free passage for the escape of hot air from within the dwelling or building.

It is one purpose of the invention to provide simple and inexpensive means or mechanism for raising and lowering the skylight and for locking the same in any position of adjustment, such locking means being combined with and forming a part of the operating mechanism.

It is a further purpose of the invention to provide a skylight with a depending flange or water-table arranged entirely around the same, so as to exclude the entrance of rain when the skylight is in its raised position.

Briefly stated, the invention consists in providing a skylight with a plurality of vertically-arranged racks which travel in guides secured within the light shaft or well and in suitably-arranged gear-wheels which mesh with said racks, the said gear-wheels being fixed to longitudinal shafts which are journaled in brackets arranged upon opposite sides of the well and in a transverse shaft geared at its ends to the longitudinal shafts, which transverse shaft when rotated imparts a rotary movement to the longitudinal shafts and through them to the gear-wheels and rack-bars to raise and lower the latter and with them the skylight, said gear-wheels being preferably rotated by means of worm-gear mechanism operated through the medium of a pulley or other wheel.

The invention comprises other features of construction and arrangements of parts, hereinafter to be described in detail and then more definitely pointed out in the claims which conclude this specification.

In order to enable others to understand, make, and use my said invention, I will proceed to describe the same in detail, reference being made for this purpose to the accompanying drawings, in which—

Figure 1 is a plan view of a light shaft or well, showing the mechanism for operating the skylight in operative position. Fig. 2 is a vertical sectional view taken on the line $x\,x$ of Fig. 1 and showing the skylight in a raised or elevated position. Fig. 3 is an enlarged view looking at the face of the operating-pulley and its supporting-bracket. Fig. 4 is a vertical sectional view of the same. Fig. 5 is a face view of one of the racks and operating-gears. Fig. 6 is a plan view, partly in section, of the supporting-brackets as they are arranged to form a guideway for the racks, the parts being separated.

Referring now to the drawings, the reference-numeral 1 designates the framework or casing of a light shaft or well of a building, over the top of which is placed the skylight 2, said skylight being arranged to be moved bodily and vertically above the shaft, so as to admit of a free escape of the heated air from within the building, whereby a more perfect circulation of air and cooling of the building is effected.

Secured to and depending vertically from opposite sides of the skylight are a series of rack-bars 3, which support the skylight in its elevated position, said rack-bars being preferably of T shape in cross-section and each having its flanged portion guided by a pair of brackets 4, each of which is provided with two overhanging shoulders 5 and an outwardly-projecting arm 6, having an opening 7 therethrough to form a bearing for the operating-shafts 8, presently to be described. It will be seen from the drawings that in the instance shown I have provided four supporting rack-bars, two upon each side of the light-shaft; but I do not wish to be understood as limiting myself to this number, for it will be obvious that the number will vary according to the size of the skylight.

The mechanism for operating the rack-bars comprises longitudinal shafts 8 8 and a transverse shaft 9, having a bevel-gear or other connection 10, whereby when a rotary motion is imparted to the said transverse shaft 9 it will be communicated to the longitudinal shafts 8. Attached to each of the shafts 8 are two or more gear-wheels 12, which mesh with the said rack-bars, so as to raise or lower them, as desired, according to the direction of rotation of the shafts. It will be understood that the longitudinal shafts are journaled in the arms 6 of the brackets 4 and that the rack-bars are held in position and guided in their movement by the overhanging shoulders 5 of the brackets 4. In practice I prefer to arrange a metal wear-plate 13 between the base of the brackets and side of the light-shaft, so as to offer a firm and rigid wearing-surface for the said rack-bars, said brackets and wear-plate being secured to the side of the light-shaft by bolts 14, common to both.

The transverse shaft 9 is supported at its ends in brackets 15, and intermediate its ends it passes through another bracket 16 of novel and peculiar form and comprising the outwardly and upwardly curved center bar 17 and the two rearwardly-extending bars 18, branching from the center bar and made integral therewith, as will be seen by reference to Figs. 3 and 4 of the drawings. The three ends of the bracket 16 are screwed or bolted to a plate 19, which in turn is secured to the end or side of the light-shaft, as shown. A short transverse shaft 20 is journaled at its opposite ends in the plate 19 and bracket 16, respectively, and fixed to or made integral with this shaft is a grooved pulley 21 and worm-wheel 22, which latter meshes with a worm-gear 23, fixed on the transverse shaft 9, as will be seen. An endless operating cord, rope, or chain 24 is passed over the pulley 21 and serves to rotate the same. This cord may be passed a number of times around the pulley, if desired, in order to more firmly grip the same, or instead of a pulley and rope I may employ a sprocket-wheel and chain without departing from the spirit of my invention, the one being the equivalent of the other in this instance.

In order to prevent rain from entering into the light shaft or well when the skylight is raised, I have provided a depending flange or water-table 25, which extends entirely around the same, and by this means it is not possible for rain to enter the building through the light-well should a storm arise when the skylight is elevated.

The operation of my device will be readily understood from the foregoing description and following brief statement: The pulley 21 being rotated by the rope 24, a rotary movement is imparted to the worm-wheel 22, worm-gear 23, and shaft 9, and through this shaft to the shafts 8 8 and gears 12, which in turn operate upon the rack-bars to raise or lower them, together with the skylight, according to the direction of movement given the pulley 21. The skylight will be locked in any position of adjustment by means of the meshing worm-gear and worm-wheel, as will be readily understood, owing to the peculiar form and coöperation of these parts, and it is not necessary, therefore, to provide any separate locking means, and this I consider as an important feature of the invention.

I am aware that it is not broadly new to provide a movable skylight, but in most instances they have been hinged at one side edge of the light-shaft, and this arrangement is objectionable, since it does not exclude the rain and must be closed during rainfall.

I am aware that it is not new to operate hinged and sliding windows, transoms, and like structures by means of rack-and-gear mechanism, and I do not, therefore, lay claim to such a construction, broadly, my invention differing from the above in the peculiar construction and arrangement of the operating mechanism, comprising the longitudinal and transverse shafts geared to work in unison and in the novel form of journal-brackets which form guideways for the rack-bars.

The important feature of this invention resides in the fact that the skylight is movable bodily in a substantially vertical direction, so as to provide a surrounding passage for the free escape of heated air from within the building, while at the same time covering the light shaft or well sufficiently to exclude the entrance of rain while the skylight is elevated.

Minor additions or changes will readily suggest themselves, and I do not therefore wish to be understood as limiting myself to the precise construction and arrangement of parts herein shown and described.

What I claim is—

1. In a skylight, the combination with a well or light-shaft, of a skylight arranged to cover the light shaft or well and to be moved bodily above the same in a vertical direction, rack-bars carried by the skylight upon opposite sides, gear-wheels coöperating with said rack-bars to raise and lower the skylight, longitudinal shafts journaled in bearings upon opposite sides of the light-well and to which said gear-wheels are fixed, and mechanism for operating said longitudinal shafts in unison to bodily raise and lower the skylight, substantially as described.

2. In a skylight, the combination with a light-shaft, of a skylight arranged to cover the light-shaft and to be moved bodily above the same in a vertical direction, rack-bars carried by the skylight upon opposite sides, gear-wheels coöperating with said rack-bars to raise and lower the skylight, longitudinal shafts journaled in bearings upon opposite sides of the light-shaft and to which said gear-wheels are fixed, a transverse shaft having a gear connection at its opposite ends with the said longitudinal shafts so as to rotate said shafts in unison, and means for rotating the said transverse shaft, whereby motion is imparted to the longitudinal shaft, substantially as described.

3. In a skylight, the combination with a light-well, of a skylight arranged to cover said well and to be moved bodily above the same in a vertical direction, rack-bars depending from opposite sides of the skylight and entering the light-well, gear-wheels coöperating with said rack-bars to raise and lower the skylight, longitudinal shafts journaled in brackets upon opposite sides of the light-well and to which said gear-wheels are fixed, a transverse shaft having bevel-gear connections at its opposite ends with the said longitudinal shafts so as to rotate the latter in unison, a worm-gear fixed to said transverse shaft, a worm-wheel meshing with said worm-gear, and means for operating said worm-wheel whereby the transverse shaft is rotated.

4. In a skylight, the combination with a light-well, of a skylight arranged to cover said well and to be moved bodily above the same in a vertical direction, rack-bars depending from opposite sides of the skylight and entering the light-well, gear-wheels coöperating with said rack-bars to raise and lower the skylight, longitudinal shafts journaled in brackets upon opposite sides of the light-well and to which said gear-wheels are fixed, a transverse shaft having bevel-gear connections at its opposite ends with the said longitudinal shafts so as to rotate the latter in unison, a worm-gear fixed to said transverse shaft, a worm-wheel meshing with said worm-gear, an operating-pulley fixed to said worm-wheel, and an endless rope passing over said operating-pulley, substantially as described.

5. In a skylight, the combination with a light-well, of a skylight arranged to cover said well and to be moved bodily above the same in a vertical path, rack-bars depending from opposite sides of the skylight and entering the light-well, gear-wheels coöperating with rack-bars to raise and lower the same, longitudinal shafts upon opposite sides of the light-well, to which said gear-wheels are fixed, divided brackets secured within the well upon opposite sides of the said rack-bars, into which said longitudinal shafts are journaled, shoulders upon said brackets which overhang the rack-bars to provide guides therefor, and means for rotating the said longitudinal shafts in unison, substantially as described.

6. In a skylight, the combination with a light-shaft, of a skylight arranged to cover said well and to be moved bodily above the same in a vertical path, rack-bars depending from opposite sides of the skylight and entering the light-well, divided brackets secured to the latter and forming guides for the said rack-bars, shoulders on said brackets which overhang the rack-bars, longitudinal shafts journaled in said brackets, gear-wheels fixed to said shafts and coöperating with the rack-bars, a transverse shaft having a bevel-gear connection at its opposite ends with the said longitudinal shafts, a center bracket into which said transverse shaft is journaled, a worm-gear fixed to the transverse shaft, a worm-wheel meshing with said worm-gear, a pulley fixed to the worm-wheel and an operating cord or rope passing over said pulley, substantially as described.

In testimony whereof I affix my signature in presence of two witnesses.

JEFFERSON D. THOMPSON.

Witnesses:
R. D. JOHNSTON, Jr.,
J. GRANVILLE MEYERS, Jr.